United States Patent
Bettger

[11] Patent Number: 6,033,169
[45] Date of Patent: Mar. 7, 2000

[54] AXIAL-ON THREADED COUPLING DEVICE

[76] Inventor: David D. Bettger, P.O. Box 726, Redondo Beach, Calif. 90277

[21] Appl. No.: 09/222,106

[22] Filed: Dec. 29, 1998

[51] Int. Cl.[7] .............................. F16B 37/08; F16B 39/36
[52] U.S. Cl. ............................ 411/433; 411/267; 411/270
[58] Field of Search .................................. 411/265, 267, 411/270, 433, 432

[56] References Cited

U.S. PATENT DOCUMENTS

| | | | |
|---|---|---|---|
| 4,378,187 | 3/1983 | Fullerton | 411/267 |
| 5,027,678 | 7/1991 | McCollum | 411/433 X |
| 5,118,237 | 6/1992 | Wright | 411/433 |
| 5,139,381 | 8/1992 | Lubreski et al. | 411/433 |
| 5,580,200 | 12/1996 | Fullerton | 411/267 |
| 5,733,084 | 3/1998 | Fullerton | 411/267 |
| 5,800,108 | 9/1998 | Cabahug | 411/433 |

FOREIGN PATENT DOCUMENTS

| | | | |
|---|---|---|---|
| 480511 | 5/1953 | Italy | 411/433 |
| 1343136 | 10/1987 | Russian Federation | 411/433 |

*Primary Examiner*—Neill Wilson
*Attorney, Agent, or Firm*—Christie, Parker & Hale, LLP

[57] ABSTRACT

An improved axial-on threaded coupling device is provided for push-on mounting to a substantially seated position on a male threaded member. The device includes a plurality of threaded coupling segments collectively forming a female threaded bore within a housing and configured for radial expansion to accommodate push-on mounting onto a male threaded member. When the device is rotated in a tightening direction, the segments are retained in threaded engagement with the male threaded member by the inner wall surfaces of the housing. When the device is rotated in an opposite direction, the fastener segments are free to expand radially outward to accommodate pull-off removal of the device from the male threaded member.

20 Claims, 7 Drawing Sheets

6,033,169

AXIAL-ON THREADED COUPLING DEVICE

FIELD OF THE INVENTION

This invention relates generally to improvements in slide-fit coupling devices of the type adapted for rapid axial push-on mounting onto a threaded bolt or other externally threaded element. More particularly, this invention relates to an improved axial-on threaded coupler designed for bi-directional axial sliding movement with respect to an associated male threaded member, thereby permitting rapid push-on mounting and rapid pull-off removal of the coupler.

BACKGROUND OF THE INVENTION

Slide-fit nuts, sometimes referred to as jam nuts, are generally known in the art for rapid push-on mounting onto a threaded bolt, stud or similar threaded structure, wherein the nut is installed onto the bolt to a seated or nearly seated position with little or no rotational motion. Such slide-fit nuts are typically constructed to include a plurality of part-cylindrical, separate nut segments which are mounted in a cylindrical array within an outer nut casing or housing. The nut segments are internally threaded to collectively define a spiral female thread for engaging a mating male thread on an associated bolt. One or more springs engage the nut segments to apply a radially inward force urging the nut segments into normal threaded engagement with the male thread. However, cam surfaces cooperating between the outer nut casing and the nut segments aid the movement of the segments to a disengaged relation to permit the nut segments to displace radially outwardly when the nut is pushed in one axial direction over the bolt. Accordingly, the slide-fit nut can be displaced rapidly over the axial length of the bolt, with a non-rotational push-on action, to a seated position in abutment with a substrate surface defined by an element which is to be held in place by the nut. If further tightening of the nut is desired, a small amount of nut rotation, to advance the nut along the male thread, can be accomplished by engaging the nut casing with a wrench or the like. For examples of push-on nuts of this general type, see U.S. Pat. Nos. 4,378,187 and 5,139,381.

While push-on nuts beneficially permit rapid nut mounting without requiring substantial nut rotation over the protruding free length of a bolt, some nuts which have been made available in the art have not permitted a similarly rapid pull-off removal from the bolt when disassembly is desired. Instead, it has been necessary to back-rotate the nut from the seated position, with such back-rotation continuing for the entire free length of the bolt until the nut is removed. In some applications, this requirement for rotational nut displacement for removal purposes can be undesirably time consuming and tedious.

Other push-on nuts described in the art have attempted to permit a pull-off removal, but have not been successful. Such nuts have not properly stayed in position under axial load. For an example of a push-on, pull-off nut, see U.S. Pat. No. 5,139,381. In that nut arrangement, a two-part cam system is used to move the nut's female thread segments into and out of engaged position. At the upper end of the nut housing, the end cap of the housing is fitted with ridges which mate with slots in the upper ends of the nut segments. Radial turning of the nut housing results in either engagement or disengagement of the nut segments from the male thread. At the lower end of the nut housing, the lower portion of the inner housing wall is angled inwardly, so that under an upward axial load, a resultant horizontal inward force keeps the nut segments in the engaged position. However, if the slope is shallow, equal to or less than the angle on the thread of the male member, under an upward axial load, such as the load imparted on the nut in its secured (fastened) state, the threaded nut segments can be forced outward by the threaded bolt, disengaging the threads, resulting in the full upward load being held by only the upper threads of the nut segments. These upper threads may remain partially engaged due to the cam ridges in the end cap which move the nut segments. Such condition often results in failure of the nut, as full load on a portion of the threads strips the threads, either on the nut segments or on the bolt. When the angle at the lower end of the nut housing is increased, the same upward axial force produces a greater inward force, keeping the nut segments in place and engaged with the threaded bolt over the length of the segments. However, this increased force reduces the ability to axially pull-off the nut.

Another shortcoming of the nut device shown in U.S. Pat. No. 5,139,381 is the lack of cooperation between the fastener segments. Proper operation of such a nut requires that the fastener segments contract into their engaged positions, in a uniform, synchronous manner. If the segments engage and disengage independently rather than in unison, the fastener may not fully disengage the threaded member, or when engaging, may not properly align with the threaded member. In the nut arrangement shown in that patent, the segment end faces which extend along the thread axis are linear, planar faces, which allow the segments to slip radially with respect to each other, provide no alignment or guidance, and do not act to keep the segments in positional coordination with each other in a generally circular pattern.

There exists, therefore, a significant need for an improved slide-fit fastener which can be mounted onto a bolt quickly and easily with simple push-on action, which will maintain threaded engagement along the length of the fastener under axial load, i.e., when the fastener is performing a fastening function, whose nut segments are configured to be self-aligning, and which is adapted for rapid removal from the bolt with a simple pull-off action. The present invention fulfills these needs and provides further related advantages.

SUMMARY OF THE INVENTION

In accordance with the invention, a mechanical fastener is provided for push-on mounting onto and pull-off removal from a male threaded member. The fastener includes a housing, which circumscribes an open axial bore. The housing contains a plurality of adjacent fastener segments, arranged in a generally cylindrical array and collectively forming a female threaded axial bore for threaded engagement with a cooperating male threaded member. The fastener segments are radially movable from a compressed position, in threaded engagement with a male threaded member, to an expanded position, effectively disengaged from the male threaded member, where the innermost diameter of the female threaded axial bore is at least as great as the outermost diameter of the male threaded member. The fastener segments move from the compressed position to the expanded position by axial motion of the fastener housing along the male threaded member. The fastener also includes cam means between the housing and the segments. The cam means functions to lock the fastener segments into their compressed position when the housing is rotated about the male threaded member in a thread advancing direction. Rotating the housing in the opposite direction releases the cam means from its locking position, allowing the segments to move radially to their expanded, effectively disengaged position upon axial movement of the housing along the threaded male member.

BRIEF DESCRIPTION OF THE DRAWINGS

Other features and advantages of the present invention will become more apparent from the following detailed description, taken in conjunction with the accompanying drawings which illustrate, by way of example, the principles of the invention with reference to presently preferred and other forms of the invention.

DETAILED DESCRIPTION

Figure 1:
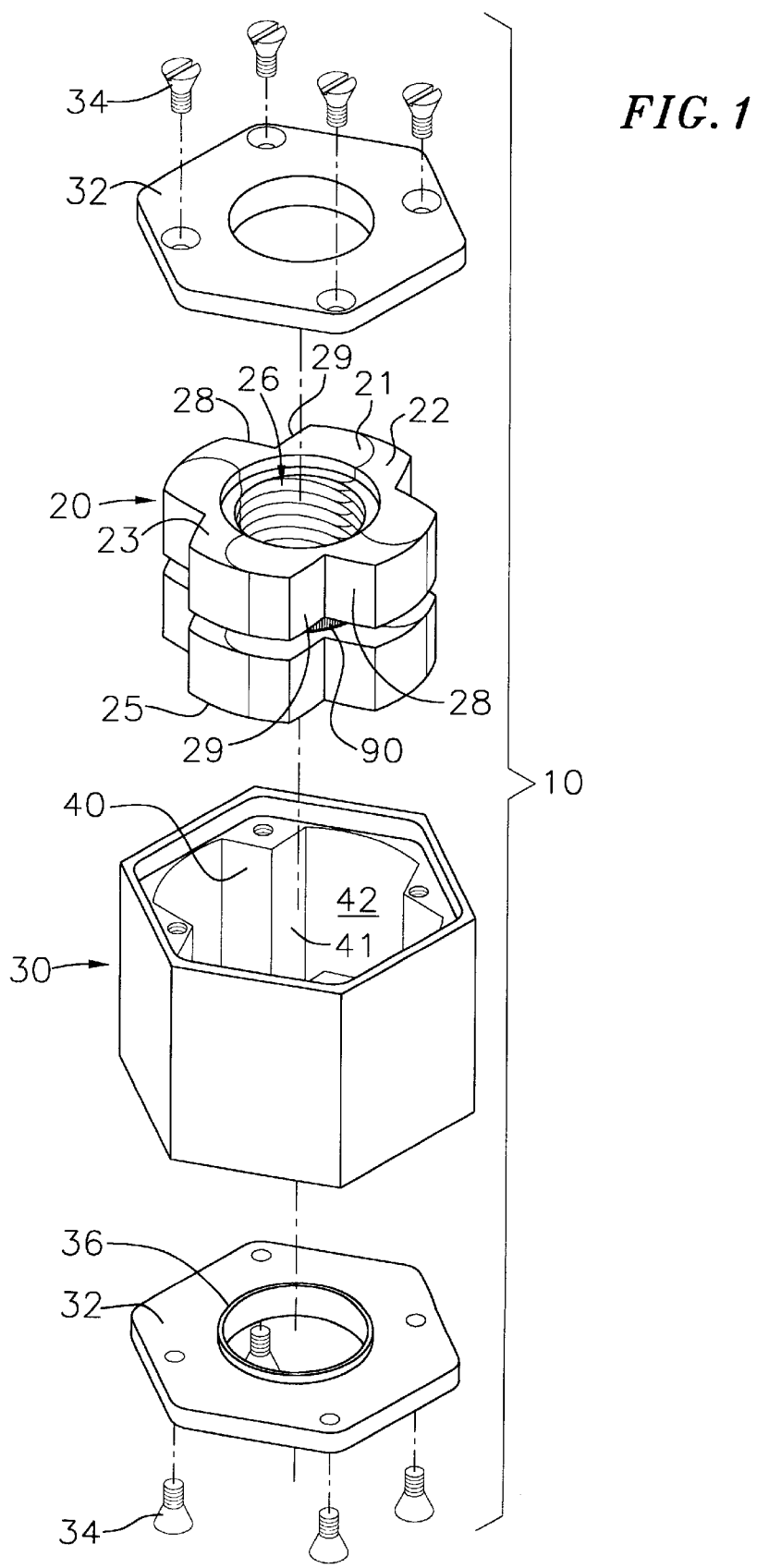
FIG. 1 is an exploded perspective view of one embodiment of an axial-on threaded fastener which constitutes an exemplary embodiment of this invention, showing the housing, the endcaps and the fastener segments.

A first threaded fastener 10 of the present invention is shown in FIG. 1. A fastener housing 30 contains a plurality of female threaded fastener segments 20.

The coupling segments 20 of the fastener are aligned in a generally circularly cylindrical array, collectively forming a collar or sleeve having a female threaded axial bore 26. In a preferred form of the fastener, each segment has top 23 and bottom 25 end surfaces, a concave inner surface and a contoured generally convex outer surface with cam faces 28 and 29, and opposite side surfaces 21 and 22 spaced angularly about the axis of curvature of the segments concave inner surface. Each segment has a convex mating face 22 at one side surface and a cooperating concave mating face 21 at the opposite side surface. Thus the concave side face 21 of each segment is matable with the convex side face 22 of the adjacent segment in that cylindrical array. This cooperative configuration of the segment sides prevents the segments from slipping randomly or independently radially with respect to each other, and acts to align the fastener segments with each other so that they experience substantially synchronous and coordinated radial movement when such movement is appropriate. Thus, when the segments move radially outward to effectively disengage, or radially inward to engage the male threaded member, the segments move in a collective, uniform and synchronous manner, retaining their generally cylindrical array. This synchronous coordination could be accomplished with other forms of non-linear mating surfaces, in addition to the concave/convex mating surfaces defined here.

Figure 3:
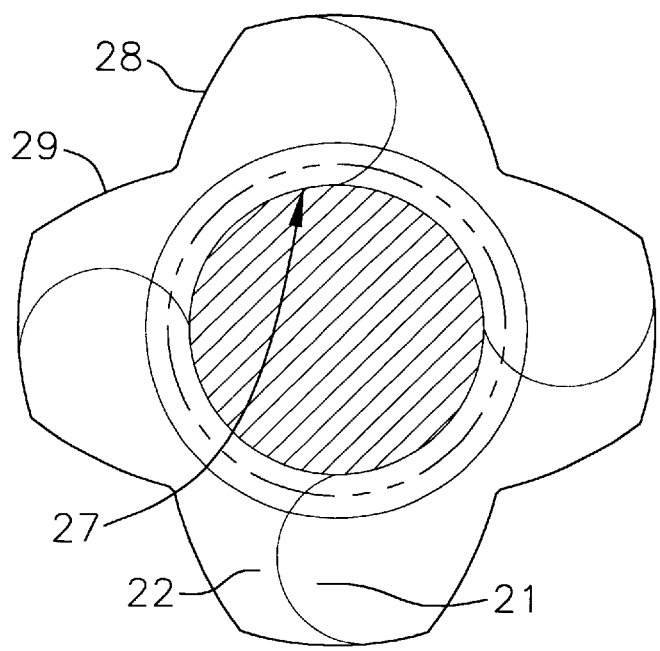
FIG. 3 is a plan view of the segments of FIG. 1, in their radially innermost relation, in threaded engagement with a male threaded fastener component.
Figure 4:
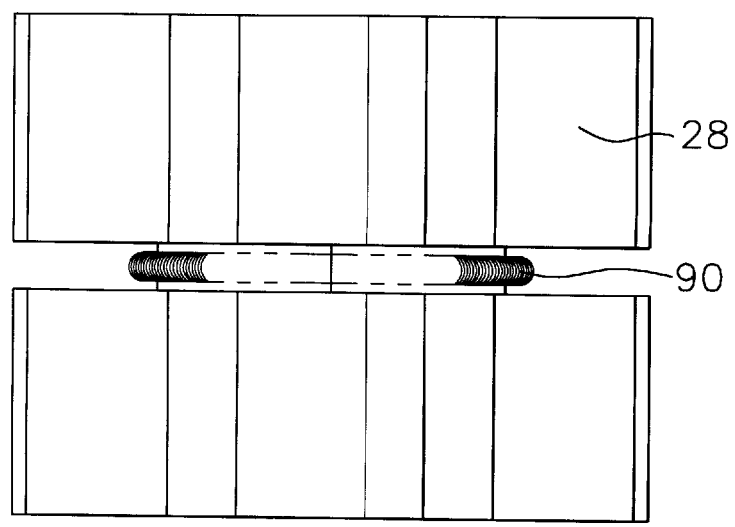
FIG. 4 is an elevation view of the fastener segments and their biasing spring assembly in the fastener of FIG. 1.

The threaded segments 20 are arranged adjacent to each other, with their respective concave inner 21 and generally convex outer 22 faces mating with the adjacent segment. The threaded segments collectively define and circumscribe a female threaded axial bore 26, configured to receive and threadedly engage a threaded male member 100. The segments 20 are biased into a compressed position as shown in FIG. 3. In one form of the fastener shown in FIG. 4, the fastener segments 20 are elastically biased into a compressed position by a spring assembly 90 engaged about the cylindrical array of fastener segments. Other means providing the necessary elasticity could also be used, such as an elastomeric band.

Figure 2A:
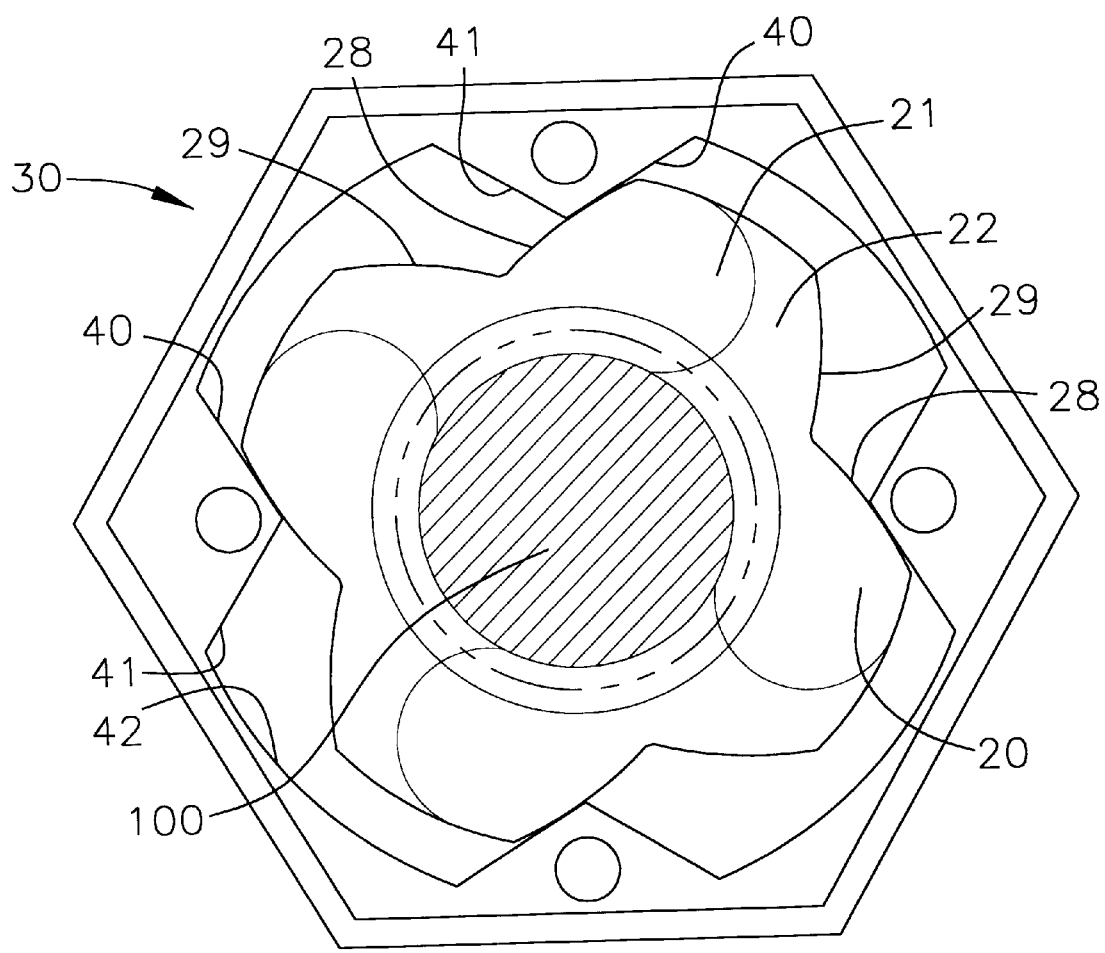
FIG. 2A is a plan view of the fastener of FIG. 1 showing the fastener segments at one limit of their range of angular movement relative to the housing.
Figure 2B:
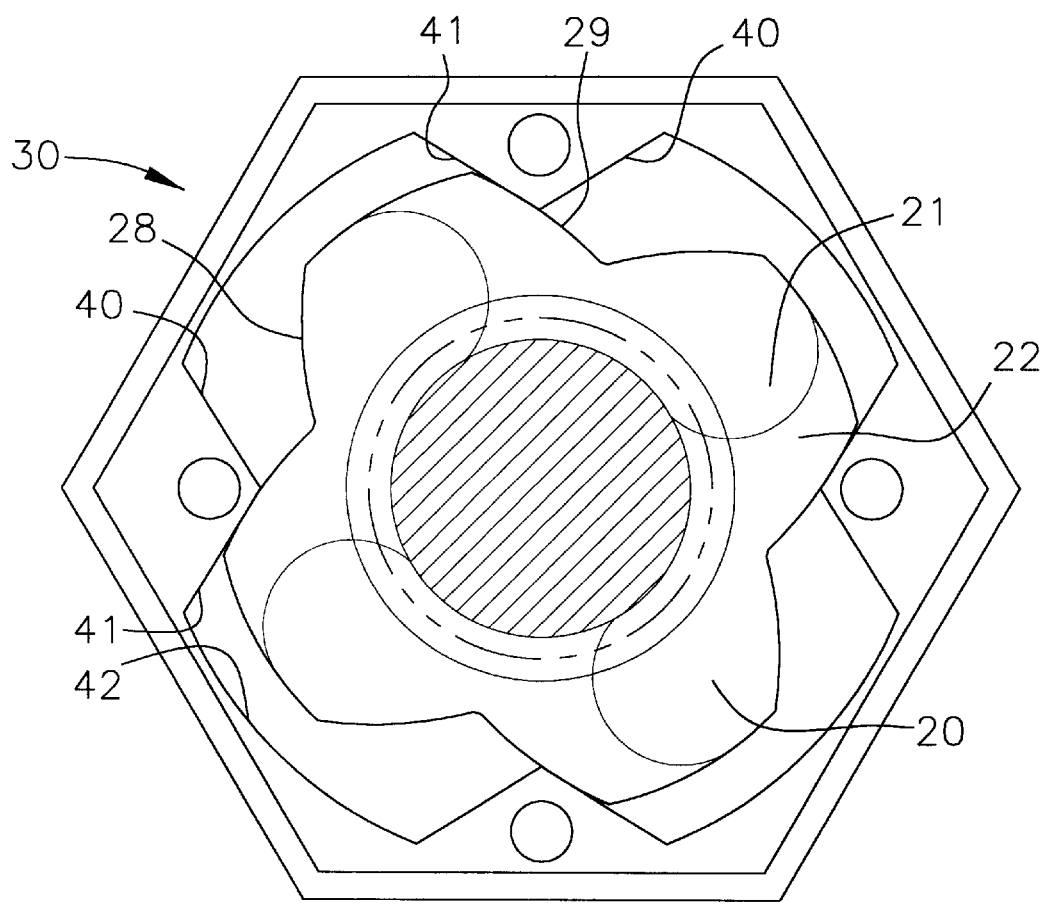
FIG. 2B is a plan view of the fastener of FIG. 1 showing the fastener segments at their opposite limit of angular movement relative to the housing.
Figure 2C:
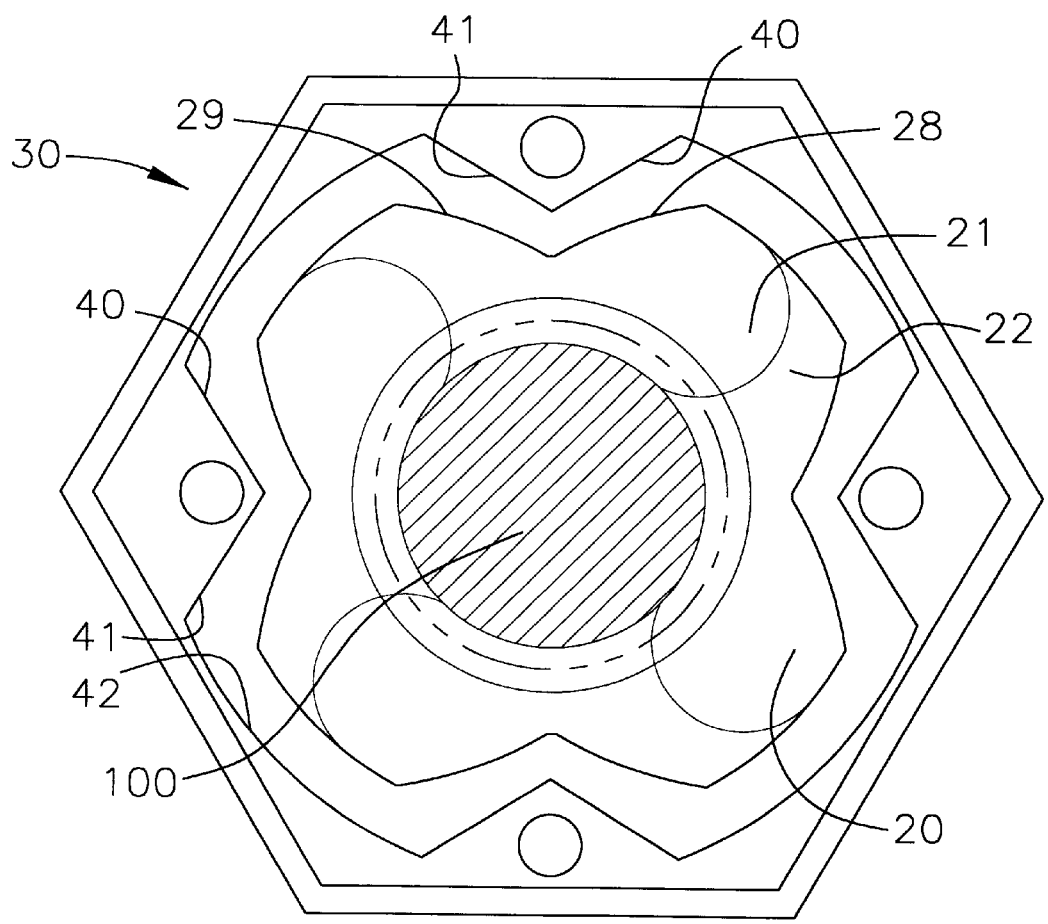
FIG. 2C is a plan view of the fastener of FIG. 1 showing the fastener segments centrally between the limits of FIGS. 2A and 2B in their innermost radial positions for threaded engagement with a male threaded fastener component.
Figure 2D:
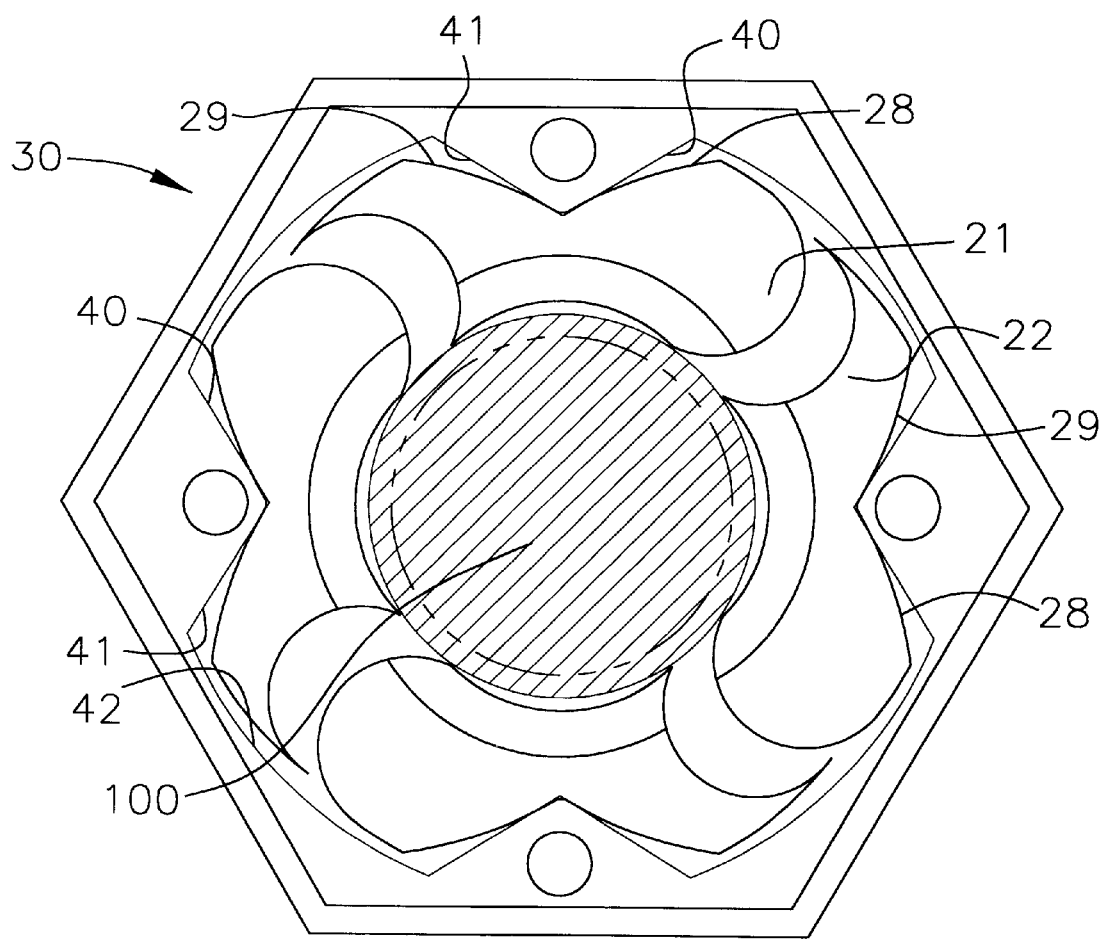
FIG. 2D is a plan view of the fastener of FIG. 1, similar to 2C, but showing the fastener segments in their outermost radial positions in the course of axial movement of the fastener along the male threaded component.

The segments may be expanded outward to an expanded position, as shown in FIG. 2D, where the innermost diameter of the collectively formed female threaded axial bore is at least as great as the outermost diameter of the male threaded member 100. Preferably, the threaded segments are constructed of steel, but could be made from any other material providing sufficient rigidity and hardness to support the necessary internal threading. In a preferred form of the fastener, each fastener segment has two camming faces 28 and 29, allowing camming action to occur upon rotation of the housing in either direction. These cam faces 28 and 29 cooperate with the inner camming surfaces 40 and 41 of the housing to lock the segments into their compressed position. Other forms of the invention may have fewer or more cam faces. Preferably, the number of cam faces of the segments corresponds directly to the number of camming surfaces of the housing. Thus if more segments are utilized withing the housing, more camming surfaces would be required along the housing walls.

The threaded segments 20 are contained in the fastener housing 30, which in the preferred embodiment has an outer hexagonal geometry to accommodate standard wrenches. Preferably, as shown in FIG. 1, the fastener housing 30 has countersunk annular endcaps 32 attached by a plurality of screws 34. The endcaps circumscribe an axial bore and provide a small lip 36 that extends into the housing to align with the collectively formed female threaded axial bore 26. The endcaps 32 function to axially contain the fastener segments 20 within the housing.

The preferred form of the fastener works in either direction.

Figure 6:
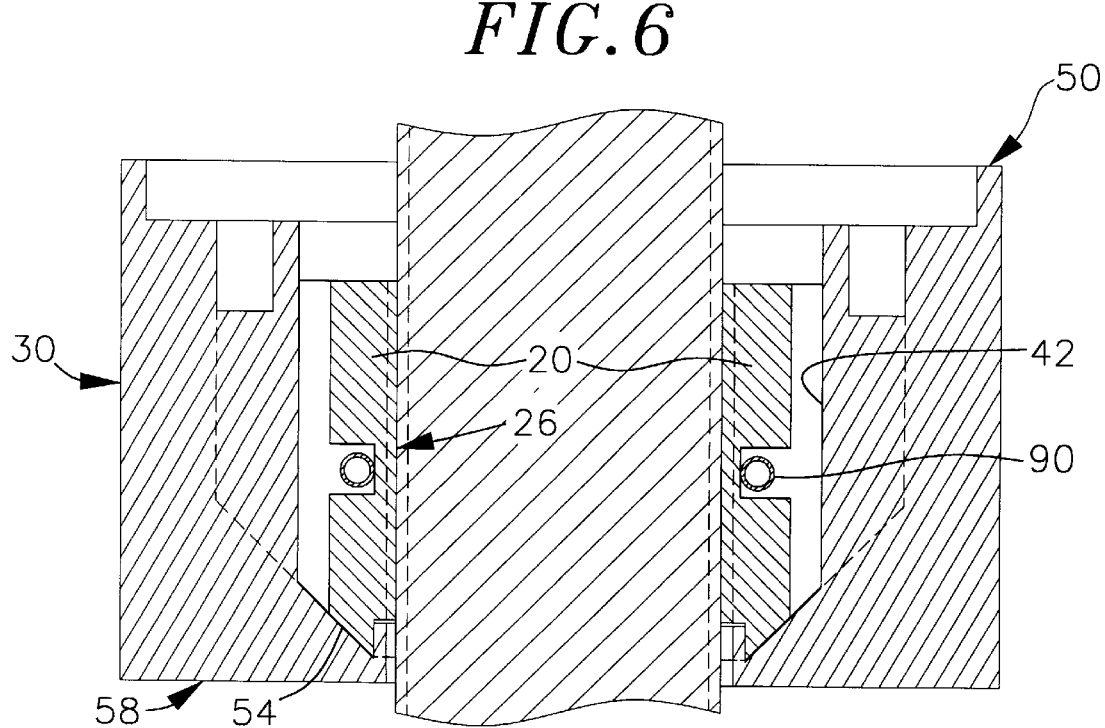
FIG. 6 is a vertical section view of a fastener which has axial-on but not axial-off gross movement capability along a male threaded fastener component.

In another form of the fastener, shown in FIG. 6, the housing 30 has a leading end 58 that has been machined, and a trailing end 50 with an annular end cap. The machined leading end 58 may be tapered upward from the axial bore 26 upward and outward to the inner side walls of the housing 42. In this particular embodiment, the threaded segments 20 are also tapered, so that when placed together, the taper extends from the female threaded axial bore 26 to the outside surface of each segment, so that the segments fit inside the tapered inner walls of the housing.

The angle of the taper of the machined inner surface of the housing controls the functioning of the fastener. Where there is no taper, movement of the housing axially along a threaded member, in either direction, causes the segments to expand, allowing for push-on mounting and pull-off removal of the fastener. The female threads of the collectively formed axial bore 26 are forced axially against the threads of the male threaded member, which pushes the segments 20 outward toward the inner walls 42 of the housing 30 because of the wedging action of the sloping faces of the thread profile. The segments 20 expand over the male thread, as shown in FIG. 2D, then are brought back into their normally biased compressed position by the spring assembly 90, as shown in FIG. 2B. This process is repeated until all the threads of the male threaded member have been overcome, resulting in a ratchet-type action for either axial push-on or pull-off movement.

The thread angle and type of the male threaded member may vary. These variations will alter the amount of axial force required for either push-on or pull-off motion, as the combination of the thread angle and the housing bottom inner surface angle determine the axial force required to translate the segments into their expanded disengaged position. However, as the female threads must traverse and override the male thread under an axial force, threads having a square profile can be used if the thread helix angle is adequate.

When the leading end 58 machined inner surface of the housing is tapered, the fastener operates as a push-on/thread-off fastener. For proper operation, the housing 30 is push-on mounted axially to a male threaded member, leading end 58 first. The segments 20 within the housing are shorter than the height of the housing, providing vertical clearance for the segments. When a push-on axial force is applied to the housing 30, the segments 20 inside the housing 30 stay in place as the housing slides axially along the male threaded member until the endcap 52 of the trailing end 50 of the housing 30 translates the axial force to the segments 20. The segments are situated in the trailing end 50 portion of the housing 30, and are free to expand to override the threads of the male threaded member.

However, when moving the housing axially to pull it off a male threaded member, the fastener segments 20 are not allowed to expand freely and instead contact the tapered leading end inner surface 54 of the housing. If the taper is shallow enough, the segments will still be allowed to expand, requiring additional force to force the segments 20 up the taper until they have room to expand beyond the outer diameter of the male threaded member. If the taper is more steep, however, or if the leading end surface of the segments is tapered to match the taper of the housing as shown in FIG. 6, the resultant force will be inadequate to force the segments up the tapered inner surface of the housing. With the segments situated in the leading end 58 tapered section 54 of the housing, there will be insufficient clearance for the segments to expand, and thus the fastener must be threaded off rather than pulled off.

The housing and segments of FIG. 1 are shown in plan view in FIG. 2A, illustrating the form of fastener with two camming surfaces, which allows the fastener to be axially pushed on or pulled off of a male threaded member, regardless of the orientation of the housing 30 on the male threaded member. This type of housing has no specific leading or trailing end, in contrast to the tapered housing of FIG. 6. The fastener housing 30 has inner side walls 42 with columnar protruding camming surfaces 40 and 41. These camming surfaces 40 and 41 match up with the respective camming faces 28 and 29 of the fastener segments, depending on the direction of rotation. This allows the camming action to occur upon rotation of the housing in either a clockwise or counter-clockwise direction. Camming action is required to either lock the fastener in a compressed threadedly engaged position, or to release the fastener from such a position. When the camming faces and camming surfaces are not engaged, the inner space of the housing provides clearance adequate to allow the fastener segments to move into their expanded position.

After pushing the fastener on to a male threaded member to a substantially seated position in axial abutting relation with a substrate, the fastener housing 30 is rotated in a thread advancing direction. FIG. 2C shows the segments in a neutral position, free to expand radially, while FIG. 2D shows the segments in their expanded position. As the fastener is pushed axially on to the male threaded member, the segments would alternate between the positions shown in FIG. 2C and FIG. 2D in a ratcheting motion. FIG. 2B shows the position of the fastener segments after a clockwise rotation. This rotation forces the respective camming surfaces 40 or 41 of the housing against the respective camming faces 28 or 29 of the fastener segments, depending on the direction of the threads and the rotation. The threaded segments 20 are thus held in their threadedly engaged position, and the fastener may not be axially removed. Upon rotation of the housing 30 in an opposite direction, the camming surfaces 40 or 41 of the housing are removed from the camming faces 28 or 29 of the fastener segments. The fastener segments 20 are then free to expand, allowing the fastener to be removed axially. Note that the rotation of the fastener housing does not expand the fastener segments, but merely removes the restraint of the housing's camming surfaces 40 or 41 from the segments' cam faces 28 or 29. The spring assembly 90 keeps the segments in a compressed, engaged position. However, upon axial movement of the housing 30, the restraint of the camming surfaces 40 or 41 having been removed from the cam faces 28 or 29, the segments 20 are free to expand and do so, expanding outwardly into their expanded, disengaged position, where the inner diameter of the collectively formed female threaded axial bore 26 is at least as great as the outer diameter of the male threaded member 100.

Figure 5:
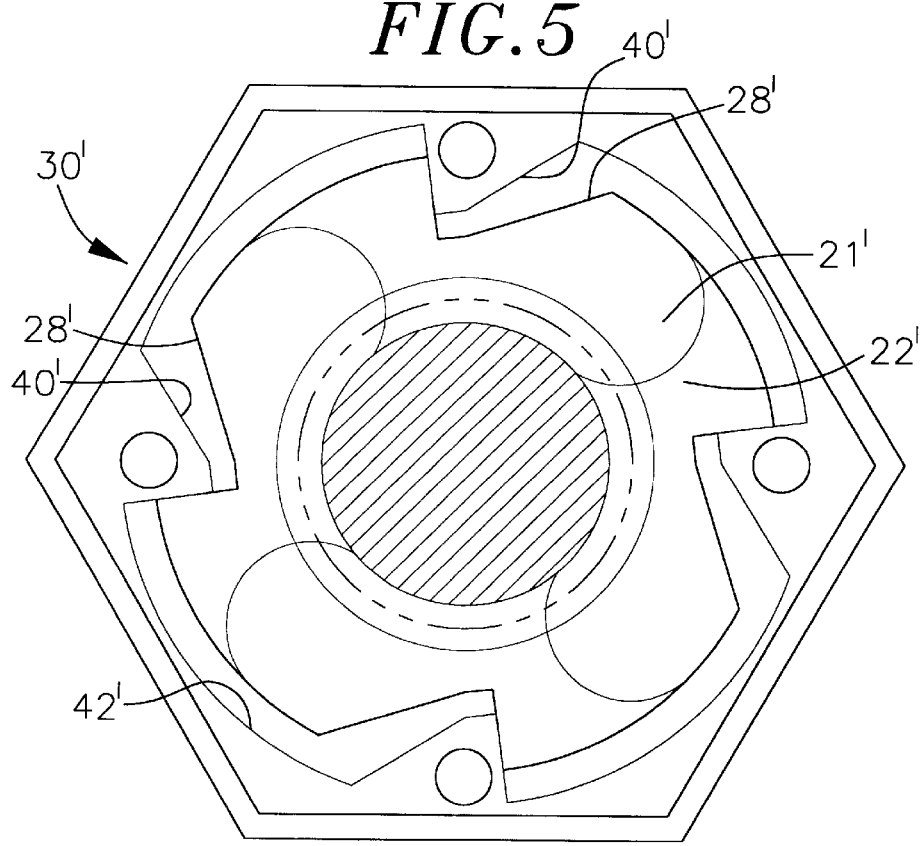
FIG. 5 is a view similar to FIG. 2A pertinent to a second form of fastener according to this invention in which the fastener is defined for axial-on and axial-off motion along a cooperating male threaded fastener component, but which has a top-end sensitivity.

In another form of the fastener, shown in FIG. 5, the fastener segments are configured to work only when the housing 30' is rotated in a single direction. The fastener segments mate with each other at the respective convex 21' and concave 22' ends. However, the fastener housing 30' must be oriented properly, depending on the thread orientation of the male threaded member. As illustrated in FIG. 5, and assuming a right hand thread on the bolt, with the fastener housing in a substantially seated position in axial abutting relation with a substrate, clockwise rotation of the fastener housing 30' would lock the fastener segments into their compressed position, with the camming surfaces 40' of the housing acting on the camming faces 28' of the segments. Rotation of the housing 30' in a counterclockwise direction would remove the engaging force and allow the segments to expand into their effectively disengaged position.

The fastener and it various forms described above has a variety of applications. Its use would be beneficial in applications requiring speedy application or removal of fasteners. For example, efficiency could be greatly increased when installing light posts for street lights if the long bolts commonly used could have the nuts pushed on axially, rather than threaded on. Also, in dangerous or hazardous environments, an individual's exposure time would be greatly reduced if fasteners could be pushed on or pulled off axially, rather than threading the fastener on or off. Another obvious application would be environments where the individual applying or removing the fastener is in a precarious position, such as in a cherry picker, on scaffolding, in the derrick of an oil rig, or even underwater or outer space applications. Here the danger to the individual would be decreased by reducing the time necessary for such jobs. Flanges or valves in positions difficult to reach could be much more quickly serviced or replaced.

The particular application would dictate the form of the fastener preferred. Whereas use on a street light base may call for an axial-on/axial-off fastener, use in a pressurized application would likely call for an axial-on/thread-off form of the fastener.

Workers skilled in the art will appreciate that the nut structures described are a form of threaded coupler device, and that the principles and benefits of this invention can be applied to and realized in other arrangements in which male and female threads cooperate to provide and adjustment or a clamping action. For example, the segment and sleeve arrangements described above can be incorporated into a C-clamp to define its female threads, or into a vise to define its female threads in the mechanisms for moving the vise jaws relative to each other. In the instance of a C-clamp, the male and female threads are not disengaged from each other, but the externally threaded stem can be positionally adjusted in the C-shaped clamp body very conveniently. Other contexts where the present coupler can be used will become apparent. The nut structures described above and shown in the drawings are but one form which this invention can take, and that form has been selected as an exemplary one for purposes of explanation of the invention.

The described forms of the threaded coupler are only preferred and/or illustrative of the inventive concept; the scope of the invention is not to be restricted to such forms or embodiments. Other arrangements may be devised by one skilled in the art without departing from the scope of the invention.

I claim:

1. A mechanical coupling device for push-on mounting onto and pull-off removal from a male threaded member, the device comprising:

a housing circumscribing an open axial bore;

a plurality of adjacent coupling segments mounted within the housing in a generally cylindrical array and collectively forming a female threaded axial bore for threaded engagement with a cooperating male threaded member, the segments being radially movable from a compressed position in threaded engagement with the male threaded member, and to which the segments are elastically biased, to an expanded position effectively disengaged from the male threaded member in which the innermost diameter of the female threaded axial bore is at least as great as the outermost diameter of the male threaded member, the segments being movable from the compressed position to the expanded position by axial motion of the housing along the male threaded member and action of the male threads on the segments;

cam means between the housing and the segments configured for locking the segments into said compressed position upon rotation of the housing on the male threaded member in a thread advancing direction of the housing about the male threaded member, and, upon rotation of the housing about the male threaded member in an opposite direction, releasing the segments from their compressed position, allowing the segments to move radially to their expanded position in response to axial movement of the housing along the male threaded member and action of the male threads on the segments.

2. A coupling device as in claim 1 wherein the cam means extends axially along the segments and the housing.

3. A coupling device as in claim 1 wherein the segments forming the female threaded axial bore each have opposite mating side surfaces with non-linear faces to cooperatively provide radial guidance and alignment, each segment being adjacent to at least one other segment.

4. A coupling device as in claim 3 wherein the non-linear side faces of the fastener segments are arcuate surfaces, each segment having a concave mating surface at one side and a convex mating surface at an opposite side, the concave mating surface of a first segment being matable with the convex mating surface of an adjacent second segment and the convex mating surface of the first segment being matable with the concave mating surface of an adjacent third segment.

5. A coupling device as in claim 1 wherein the means for elastic bias of the segments is provided by a spring assembly engaged about the cylindrical array of segments.

6. A coupling device as in claim 1 wherein the housing has one or more removable annular endcaps.

7. A coupling device as in claim 6 wherein the removable annular endcaps are attached to the housing by screws.

8. A coupling device as in claim 6 wherein the removable annular endcaps are countersunk into the housing.

9. A coupling device as in claim 1 wherein the housing has a bottom inner surface and inner side walls, the bottom inner surface at locations aligned with the segments being angled radially upward and outward from the axial bore to the inner side walls.

10. A coupling device as in claim 9 wherein each of the segments has a bottom end surface, at least a portion of which is angled to match the angle of the bottom inner surface of the housing.

11. A coupling device as in claim 10 wherein the angle for both the bottom inner surface of the housing and the bottom end surface of the segments is a locking taper angle.

12. A coupling device as in claim 11 wherein the angle for both the bottom inner surface of the housing and the bottom end surface of the segments is substantially 45 degrees.

13. A coupling device as in claim 11 wherein the angle for both the bottom inner surface of the housing and the bottom end surface of the segments is greater than the thread angle on the male member.

14. A coupling device as in claim 1 wherein the housing comprises an inclined annular cam surface extending radially inwardly and axially forwardly on said nut housing, said cam surface terminating at a radially inner end in an axially rearwardly projecting retainer rim.

15. A coupling device as in claim 1 wherein the segments each include a leading end face set angularly for mating engagement with said cam surface.

16. A mechanical coupling device for push-on mounting onto a male threaded member, the device comprising:

a housing circumscribing an open axial bore;

a plurality of adjacent coupling segments mounted within the housing in a generally cylindrical array and collectively forming a female threaded axial bore for threaded engagement with a cooperating male threaded member, the segments being radially movable from a compressed position in threaded engagement with the male threaded member, and to which the segments are elastically biased, to an expanded position effectively disengaged from the male threaded member in which the innermost diameter of the female threaded axial bore is at least as great as the outermost diameter of the male threaded member, the segments being movable from the compressed position to the expanded position by axial motion of the housing along the male threaded member and action of the male threads on the segments;

cam means between the housing and the segments configured for locking the segments into said compressed position upon rotation of the housing on the male threaded member in a thread advancing direction of the housing about the male threaded member.

17. A plurality of thread-defining coupling segments configured to be arranged in a generally cylindrical array and to collectively form a female threaded axial bore of predetermined diameter, each segment having opposite mating side surfaces with non-linear faces to cooperatively provide radial guidance and alignment for radial compression into the generally cylindrical axial bore, or expansion into a larger diameter segmented cylindrical array.

18. A mechanical coupling device for push-on mounting onto and pull-off removal from a male threaded member, the device comprising:

a housing circumscribing an opening axial bore;

a plurality of adjacent coupling segments mounted within the housing in generally cylindrical array and collectively forming a female threaded axial bore for threaded engagement with a cooperating male threaded member, the segments being radially movable from a compressed position in threaded engagement with the male threaded member to an expanded position effectively disengaged from the male threaded member in which the innermost diameter of the female threaded axial bore is at least as great as the outermost diameter of the male threaded member, the segments being movable from the compressed position to the expanded position by axial motion of the housing along the male threaded member and action of the male threads on the segments, the segments each having opposite mating arcuate side surfaces to cooperatively provide radial guidance and alignment, the arcuate surfaces comprising a concave mating surface at one side and a convex mating surface at an opposite side, the concave mating surface of a first segment being matable with the convex mating surface of an adjacent second segment and the convex mating surface of the first segment being matable with the concave mating surface of an adjacent third segment, and cam means extending axially along the segments and the housing and configured for locking the segments into said compressed position upon rotation of the housing on the male threaded member in a thread advancing direction of the housing about the male threaded member, and, upon rotation of the housing about the male threaded member in an opposite direction, releasing the segments from their compressed position, allowing the segments to move radially to their expanded position in response to movement of the housing along the male threaded member and action of the male threads on the segments.

19. A mechanical coupling device for push-on mounting onto and pull-off removal from a male threaded member, the device comprising:

a housing circumscribing an open axial bore, the housing comprising an inclined annular cam surface extending radially inwardly and axially forwardly on said nut housing about the bore, said cam surface terminating at a radially inner end in an axially rearwardly projecting retainer rim;

a plurality of adjacent coupling segments mounted within the housing in a generally cylindrical array and collectively forming a female threaded axial bore for threaded engagement with a cooperating male threaded member, the segments being radially movable from a compressed position in threaded engagement with the male threaded member in which the innermost diameter of the female threaded axial bore is at least as great as the outermost diameter of the male threaded member, the segments being movable from the compressed position to the expanded position by axial motion of the housing along the male threaded member and action of the male threads on the segments;

cam means between the housing and the segments configured for locking the segments into said compressed position upon rotation of the housing on the male threaded member in a thread advancing direction of the housing about the male threaded member, and, upon rotation of the housing about the male threaded member in an opposite direction, releasing the segments from their compressed position, allowing the segments to move radially to their expanded position in response to movement of the housing along the male threaded member and action of the male threads on the segments.

20. A plurality of thread-defining coupling segments configured to be arranged in a generally cylindrical array and to collectively form a female threaded axial bore of predetermined diameter, each segment having opposite mating side surfaces with non-linear faces to cause the segments to be movable in unison toward and away from the center of the bore.

* * * * *

UNITED STATES PATENT AND TRADEMARK OFFICE
CERTIFICATE OF CORRECTION

PATENT NO. : 6,033,169  
APPLICATION NO. : 09/222106  
DATED : March 7, 2000  
INVENTOR(S) : David D. Bettger Page 1 of 1

It is certified that error appears in the above-identified patent and that said Letters Patent is hereby corrected as shown below:

Column 8, line 17, after "wherein the" delete "means for".

Signed and Sealed this

Twenty-fifth Day of December, 2007

JON W. DUDAS  
*Director of the United States Patent and Trademark Office*